United States Patent
Kendricks

(10) Patent No.: US 9,970,560 B2
(45) Date of Patent: May 15, 2018

(54) WHEEL AND TIRE SEALING SYSTEM WITH FUSE PLUG

(71) Applicant: GOODRICH CORPORATION, Charlotte, NC (US)

(72) Inventor: Warren Kendricks, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 14/801,294

(22) Filed: Jul. 16, 2015

(65) Prior Publication Data
US 2017/0015135 A1 Jan. 19, 2017

(51) Int. Cl.
| F16K 17/40 | (2006.01) |
| F16K 17/38 | (2006.01) |
| B64C 25/36 | (2006.01) |
| B60B 21/02 | (2006.01) |
| B60B 21/12 | (2006.01) |

(52) U.S. Cl.
CPC ............ *F16K 17/383* (2013.01); *B60B 21/02* (2013.01); *B60B 21/12* (2013.01); *B64C 25/36* (2013.01); *F16K 17/40* (2013.01)

(58) Field of Classification Search
CPC ......... B60B 21/12; B60B 21/02; B64C 25/36; B60C 29/00; B60C 29/02; B60C 29/068; F16K 17/40; F16K 17/383; Y10T 137/1812
USPC ...................................................... 137/72, 73
See application file for complete search history.

(56) References Cited

U.S. PATENT DOCUMENTS

| 3,201,174 A | | 8/1965 | Stanton | |
| 3,517,683 A | * | 6/1970 | Chandler | ................ B64C 25/36 |
| | | | | 116/218 |
| 4,628,953 A | * | 12/1986 | Correll | .................... B64C 25/36 |
| | | | | 137/74 |
| 4,989,627 A | * | 2/1991 | McAfee | .................. B64C 25/36 |
| | | | | 137/72 |
| 5,269,336 A | | 12/1993 | Subramanian | |
| 2001/0010241 A1 | * | 8/2001 | Usui | ..................... B32B 15/015 |
| | | | | 148/336 |

(Continued)

FOREIGN PATENT DOCUMENTS

| EP | 0191717 | 8/1986 |
| GB | 963392 | 7/1964 |

OTHER PUBLICATIONS

Extended European Search Report dated Oct. 20, 2016 in European Application No. 16179902.8.

(Continued)

*Primary Examiner* — Kip T Kotter
*Assistant Examiner* — Scott A Browne
(74) *Attorney, Agent, or Firm* — Snell & Wilmer L.L.P.

(57) ABSTRACT

A sealing system is provided. The sealing system may include a wheel, a tire disposed about the wheel and defining a chamber between the wheel and the tire, and a first passage to the chamber through the wheel. A fuse plug may be disposed within the first passage. The fuse plug may comprise an annular body having a second passage defined by an inner wall. A groove may be formed circumferentially about an outer surface of the annular body. A seal ring may be configured to settle in the groove and sealably engage the first passage. A fusible material may be retained within the second passage defined by the inner wall.

20 Claims, 5 Drawing Sheets

(56) References Cited

U.S. PATENT DOCUMENTS

2009/0026659 A1* 1/2009 Vontell, Sr. ............. B29C 33/76
264/328.7
2009/0056850 A1* 3/2009 Yanagi .................. B29C 73/166
152/504
2010/0308060 A1 12/2010 Lammers

OTHER PUBLICATIONS

Communication pursuant to Article 94(3) EPC in EP Application No. 16179902.8.

* cited by examiner

WHEEL AND TIRE SEALING SYSTEM WITH FUSE PLUG

FIELD

The present disclosure relates to plugs for pressurized systems, and, more specifically, to a fuse plug for use in a pressurized system.

BACKGROUND

Aircraft accelerate and decelerate quickly on land, relying heavily on wheel braking systems. During a rejected takeoff (RTO) or a landing, the braking systems may be subject to extreme heat. Hard braking applied on shorter runways may augment the heat increase of the braking system. The heat in the brake systems may result in a significant increase in tire temperature and pressure. Extreme increases in temperature and pressure may tend to liberate tires from wheels.

Plugs and valves in the wheels may be used to vent pressure as wheels and tires are exposed to temperature and pressure increases. However, after heat cycling combined with rolling stresses on the wheels, the plugs and valves may not seal air as well as when they were first installed. During landing and RTO events the increased pressure in the tires may cause air to evacuate the tires at a relatively high rate. Thus, the plugs and valves used in wheel systems may tend to increase tire-pressure maintenance.

SUMMARY

According to various embodiments, a fuse plug may comprise an annular body having a passage defined by an inner wall. A groove may be formed circumferentially about an outer surface of the annular body. A seal ring may be configured to settle in the groove. A fusible material may be retained within the passage defined by the inner wall.

In various embodiments, the seal ring may be configured to sealably engage a wall of an aperture. The annular body may comprise aluminum. The fusible material may comprise a tin and zinc alloy. The seal ring may comprise silicone. The annular body may comprise a layer of nickel on the inner wall. The groove may comprise a radial contour.

According to various embodiments, a plug may comprise an annular body having a passage defined by an inner wall. The inner wall may comprise a nickel layer. A groove may be formed circumferentially about an outer surface of the annular body, and a seal ring may be configured to settle in the groove. The seal ring may also comprise at least one of silicone or rubber. A fusible material may be retained within the passage defined by the inner wall.

In various embodiments, the seal ring may be configured to sealably engage a wall of an aperture. A diameter of the inner wall may be between 0.149 inches and 0.151 inches (3.78 mm and 3.84 mm). An outer diameter of the annular body may be between 0.245 inches and 0.247 inches (6.22 mm and 6.27 mm). A diameter of the seal ring may be between 0.175 inches and 0.185 inches (4.45 mm and 4.70 mm). The fusible material may be flush within 0.015 inches (0.381 mm) of an end surface of the annular body. The annular body may comprise aluminum. The fusible material may comprise a tin and zinc alloy.

According to various embodiments, a wheel and tire system may include a wheel, a tire disposed about the wheel and defining a chamber between the wheel and the tire, and a first passage to the chamber through the wheel. A fuse plug may be disposed within the first passage. The fuse plug may comprise an annular body having a second passage defined by an inner wall. A groove may be formed circumferentially about an outer surface of the annular body. A seal ring may be configured to settle in the groove and sealably engage the first passage. A fusible material may be retained within the second passage defined by the inner wall.

In various embodiments, the annular body may comprise aluminum. The fusible material may comprise a tin and zinc alloy. The annular body may also comprise a layer of nickel on the inner wall. The seal ring may comprise at least one of silicone or rubber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Fuse plugs may be used to seal an opening in a wheel to allow venting of tire pressure during RTO and/or landing events. The fuse plugs may comprise a fusible material inside of an annular, rigid body. The fusible material (e.g., a eutectic alloy) may melt in response to the elevated temperature and pressure within the tire. The fusible material may then liberate from the rigid body, allowing air to vent from the tire. The rigid body may be retained in the wheel or ejected. Fusible plugs of the present disclosure may be retained within adapters or directly in wheels. The fusible plugs may also enable increased venting air flow and improve air retention absent the elevated temperatures of RTO and landing events.

Figure 1:
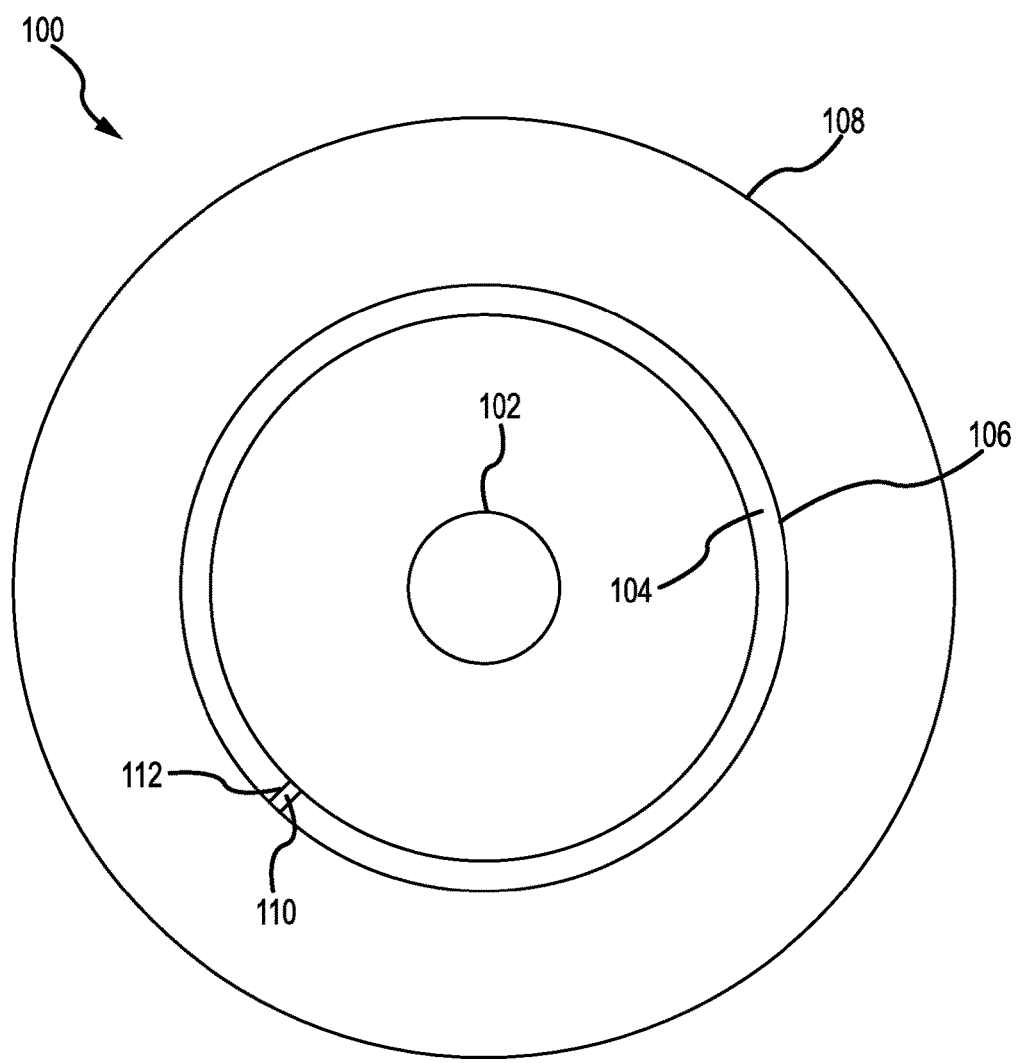
FIG. 1 illustrates an exemplary wheel and tire system including a fuse plug to seal a pressurized compartment, in accordance with various embodiments.

With reference to FIG. 1, an exemplary wheel and tire system 100 is shown, in accordance with various embodiments. Wheel 104 may comprise a hub 102 located centrally and a wall 106 configured to interface with tire 108. A chamber may thus be formed between wall 106 of wheel 104 and tire 108. Passage 112 (also referred to herein as an aperture, cavity, or opening) may be formed through wall 106 of wheel 104. Passage 112 may fluidly connect the chamber between tire 108 and wall 106 to the surrounding atmosphere. Fuse plug 110 may be lodged in passage 112 to seal the chamber between tire 108 and wall 106. Fuse plug 110 may partially or completely eject from passage 112 in response to elevated temperatures combined with air pressure directed radially inward towards hub 102.

Figure 2:
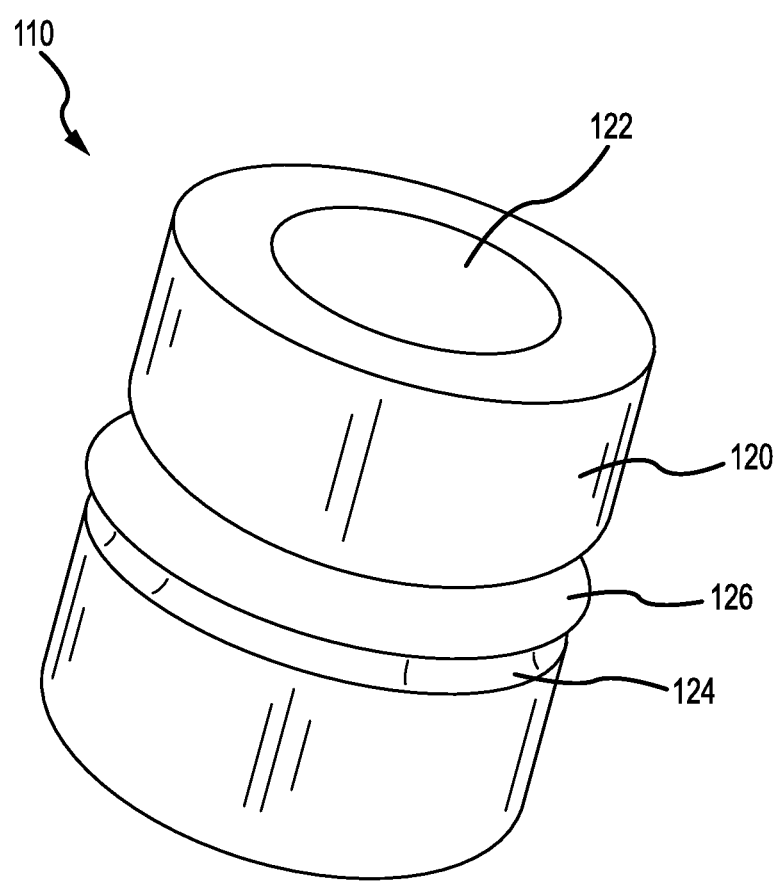
FIG. 2 illustrates a fuse plug having a fusible portion within a rigid body and a ring seal, in accordance with various embodiments.
Figure 3:
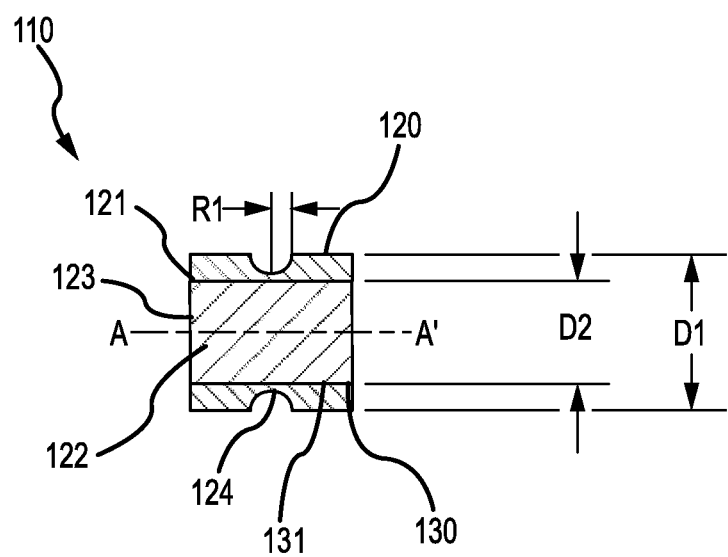
FIG. 3 illustrates a cross-sectional view of a fuse plug having a fusible material retained within a body.

With reference to FIGS. 2 and 3, fuse plug 110 is shown, in accordance with various embodiments. Fuse plug 110 may have an annulus 120, also referred to herein as an annular body. Annulus 120 may be formed from a metallic material such as an aluminum alloy. For example, annulus 120 may be formed from specification 6061 aluminum alloy. 6061 aluminum alloy may have a composition of silicon (minimum 0.4%, maximum 0.8% by weight), iron (no minimum, maximum 0.70% by weight), copper (minimum 0.15%, maximum 0.40% by weight), manganese (no minimum, maximum 0.15% by weight), magnesium (minimum 0.8%, maximum 1.2% by weight), chromium (minimum 0.04%, maximum 0.35% by weight), zinc (no minimum, maximum 0.25% by weight), titanium (no minimum, maximum 0.15% by weight), other elements (no more than 0.05% each, 0.15% total by weight), with a remainder of aluminum (95.85% to 98.56% by weight). The metallic material may be selected for favorable corrosion properties as annulus 120 comes into contact with fusible material 122 or with a nickel coating formed on inner surface 130.

In various embodiments, annulus 120 may retain a fusible material 122, also referred to herein as a eutectic alloy, in a central cavity defined by inner surface 130 of annulus 120. Fusible material 122 may comprise a tin alloy selected for favorable corrosion characteristics with annulus 120. For example, fusible material may be a eutectic alloy comprising 91% tin by weight and 9% zinc by weight, other tin and zinc alloys, or other eutectic alloys having a suitable melting point (i.e., a melting point below the elevated temperature during an RTO and/or or landing event 199° C. (390° F.). Outer surface 131 of fusible material may contact and bond to inner surface 130 of annulus 120. Annulus 120 may have groove 124 formed about an outer diameter of annulus 120 circumferentially and configured to retain seal ring 126 in groove 124. Groove 124 may be a radial groove having a radial contour of radius R1. Radius R1 may be 0.016 inches (0.41 mm). Radius R1 may also be between 0.01 inches (0.25 mm) and 0.02 inches (0.51 mm). Seal ring 126 may rest in groove 124 to provide sealing between annulus 120 and passage 112 of FIG. 1. Seal ring 126 may comprise a silicone or rubber material having flexible properties allowing seal ring 126 to expand and pass around annulus 120 and contract to settle in groove 124. Groove 124 may retain seal ring 126 in place about annulus 120.

In various embodiments, fuse plug 110 may be axially symmetric about axis A-A'. Annulus 120 may have an outer diameter D1 and an inner diameter D2. Outer diameter D1 may range from 0.247 inches to 0.245 inches (6.27 mm to 6.22 mm). Outer surface 131 of fusible material 122 may be bonded to annulus 120 along inner surface 130. Surface 123 of fusible material 122 may be a flat surface protruding slightly from, recessed slightly from, or flush with end surface 121 of annulus 120. Surface 123 of fusible material 122 may thus be flush within 0.015 inches (0.381 mm) of end surface 121. Inner surface 130 of annulus 120 may comprise a nickel coating so that a nickel layer is disposed between fusible material 122 and inner surface 130

Figure 4B:
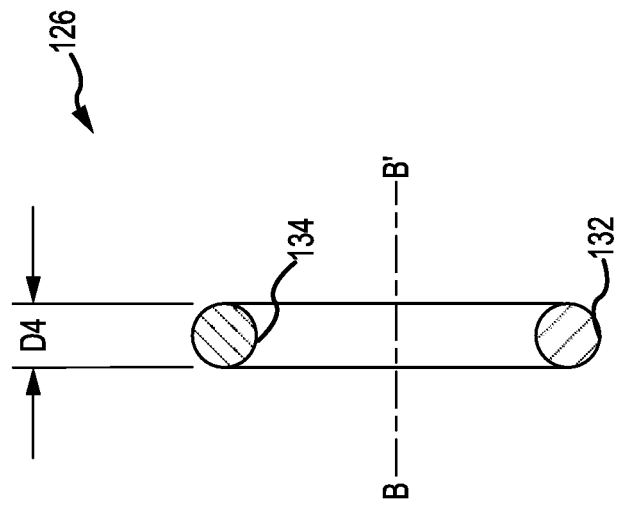
FIG. 4B illustrates a cross-sectional view of a seal ring for use with a fuse plug, in accordance with various embodiments.
Figure 4A:
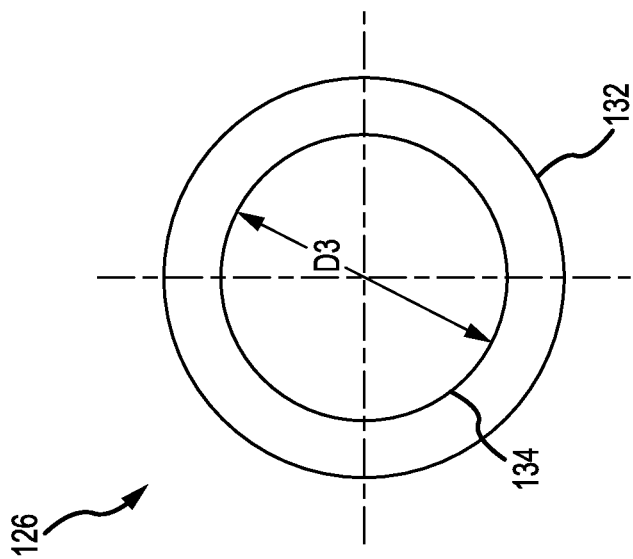
FIG. 4A illustrates a seal ring for use with a fuse plug, in accordance with various embodiments.

With reference to FIGS. 4A and 4B, seal ring 126 is shown, in accordance with various embodiments. Seal ring 126 may be an annular ring having a circular cross section. Seal ring 126 may have a diameter D3 that is less than outer diameter D1 so that seal ring 126 settles in groove 124. Diameter D3 may be between 0.185 and 0.175 inches (4.70 mm and 4.45 mm), for example. Seal ring 126 may have an inner diameter 134 and outer diameter 132 with inner diameter 134 having the diameter D3. Seal ring 126 may be axially symmetric about axis B-B'. Seal ring 126 may have an axial diameter D4. Axial diameter D4 may be between 0.035 and 0.041 inches (0.889 mm and 1.04 mm).

Figure 5:
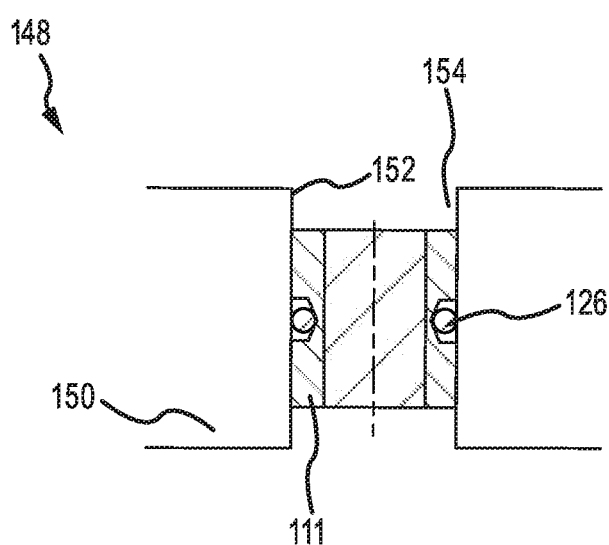
FIG. 5 illustrates a perspective view of a threaded adapter having an opening to receive a fuse plug, in accordance with various embodiments.

With reference to FIG. 5, seal system 148 is shown with fuse plug 111 (similar to fuse plug 110 of FIG. 3) inserted into passage 154 of structure 150. Wall 152 may engage fuse plug 111 and sealably engage seal ring 126. Wall 152 of structure 150 may define cylindrical opening having diameter D5. Fuse plug 111 may lodge in passage 154 against wall 152 and obstruct passage 154 to prevent gas from flowing through passage 154. Fuse plug 111 may be smaller than passage 154 with space available between fuse plug 111 and wall 152 for gas to pass through. Seal ring 126 may sealably engage wall 152 in a manner that deforms seal ring 126 and limits or prevents gas from passing through passage 154 between fuse plug 111 and wall 152.

With reference to FIGS. 3 and 5, as air adjacent fuse plug 111 heats, the fusible material 122 of fuse plug 111 may melt and eject from annulus 120 and out from passage 154. Annulus 120 may be retained in passage 154 with an opening for air to pass through where fusible material 122 was previously located. In that regard, fuse plug 111 and passage 154 may enable evacuation of high pressure air in response to a RTO or landing event. Furthermore, fuse plug 111 with an annulus 120 may improve durability across heat cycles and rolling wheel stresses and improve the joint between fusible material 122 and annulus 120 to air leakage.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fuse plug, comprising:
   an annular body having a length, an outer diameter and an inner wall defining a passage through the annular body, the outer diameter of the entire annular body being substantially constant and defining an outer wall along the length;
   a groove formed circumferentially about and within the outer wall of the annular body;
   a seal ring configured for placement in the groove; and
   a fusible material retained within the passage defined by the inner wall.

2. The fuse plug of claim 1, wherein the seal ring is configured to sealably engage a wall of an aperture.

3. The fuse plug of claim 1, wherein the annular body comprises aluminum.

4. The fuse plug of claim 3, wherein the fusible material comprises a tin and zinc alloy.

5. The fuse plug of claim 4, wherein the seal ring comprises silicone.

6. The fuse plug of claim 4, wherein the annular body comprises a layer of nickel on the inner wall.

7. The fuse plug of claim 5, wherein the groove comprises a radial contour.

8. A plug, comprising:
   an annular body having a length, an outer diameter and an inner wall defining a passage through the annular body, the outer diameter of the entire annular body being substantially constant and defining an outer wall along the length, wherein the inner wall comprises a nickel layer;
   a groove formed circumferentially about the outer wall of the annular body;
   a seal ring configured to settle in the groove, wherein the seal ring comprises at least one of silicone or rubber; and
   a fusible material retained within the passage defined by the inner wall.

9. The plug of claim 8, wherein the seal ring is configured to sealably engage a wall of an aperture.

10. The plug of claim 8, wherein a diameter of the inner wall is between 0.149 inches and 0.151 inches.

11. The plug of claim 10, wherein the outer diameter of the annular body is between 0.245 inches and 0.247 inches.

12. The plug of claim 11, wherein an inner diameter of the seal ring is between 0.175 inches and 0.185 inches.

13. The plug of claim 10, wherein the fusible material is flush within 0.015 inches of an end surface of the annular body.

14. The plug of claim 8, wherein the annular body comprises aluminum.

15. The plug of claim 8, wherein the fusible material comprises a tin and zinc alloy.

16. A wheel and tire system, comprising:
   a wheel;
   a tire disposed about the wheel and defining a chamber between the wheel and the tire;
   a first passage to the chamber through the wheel; and
   a fuse plug disposed within the first passage, the fuse plug comprising:
      an annular body having a length, an outer diameter and an inner wall defining a second passage through the annular body, the outer diameter of the entire annular body being substantially constant and defining an outer wall along the length,
      a groove formed circumferentially about the outer wall of the annular body,
      a seal ring configured for disposition in the groove and to sealably engage the first passage, and
      a fusible material retained within the second passage defined by the inner wall.

17. The wheel and tire system of claim 16, wherein the annular body comprises aluminum.

18. The wheel and tire system of claim 17, wherein the fusible material comprises a tin and zinc alloy.

19. The wheel and tire system of claim 18, wherein the annular body comprises a layer of nickel on the inner wall.

20. The wheel and tire system of claim 19, wherein the seal ring comprises at least one of silicone or rubber.

* * * * *